(12) United States Patent
Song et al.

(10) Patent No.: US 11,528,118 B2
(45) Date of Patent: Dec. 13, 2022

(54) TRANSMISSION METHOD, MOBILE TERMINAL AND NETWORK DEVICE

(71) Applicant: VIVO MOBILE COMMUNICATION CO., LTD., Guangdong (CN)

(72) Inventors: Yang Song, Guangdong (CN); Xueming Pan, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 131 days.

(21) Appl. No.: 16/960,340

(22) PCT Filed: Dec. 27, 2018

(86) PCT No.: PCT/CN2018/124236
§ 371 (c)(1),
(2) Date: Jul. 7, 2020

(87) PCT Pub. No.: WO2019/137224
PCT Pub. Date: Jul. 18, 2019

(65) Prior Publication Data
US 2020/0374093 A1    Nov. 26, 2020

(30) Foreign Application Priority Data
Jan. 12, 2018    (CN) .......................... 201810031713.2

(51) Int. Cl.
*H04L 5/00*    (2006.01)
*H04W 72/12*    (2009.01)

(52) U.S. Cl.
CPC .......... *H04L 5/0094* (2013.01); *H04L 5/0044* (2013.01); *H04L 5/0057* (2013.01); *H04W 72/1268* (2013.01); *H04W 72/1289* (2013.01)

(58) Field of Classification Search
CPC ... H04L 5/0094; H04L 5/0044; H04L 5/0057; H04L 5/0048; H04L 5/0053;
(Continued)

(56) References Cited

U.S. PATENT DOCUMENTS

2015/0244443 A1*    8/2015   Papasakellariou .... H04L 1/0026
                                                              370/329
2017/0086175 A1    3/2017   Yasukawa et al.
(Continued)

FOREIGN PATENT DOCUMENTS

CN    106067845 A    11/2016
CN    106559884 A    4/2017
(Continued)

OTHER PUBLICATIONS

Notice of Reasons for Refusal of JP Application No. 2020-538044, dated Oct. 3, 2021, 4 Pages and 4 pages of translation.
(Continued)

*Primary Examiner* — Thai Nguyen
(74) *Attorney, Agent, or Firm* — Brooks Kushman P.C.

(57) ABSTRACT

A transmission method, a mobile terminal and a network device are provided. The transmission method includes: receiving the DCI sent by the network side, where the DCI is configured to indicate a scheduling of an uplink service data and indicate to report an Aperiodicity-Channel State Information (A-CSI) report, and performing a physical layer
(Continued)

```
┌─────────────────────────────────────────────────────────────┐ 101
│ receiving DCI sent by a network side, where the DCI is      │
│ configured to indicate a scheduling of an uplink service    │
│ data and indicate to report an A-CSI report                 │
└─────────────────────────────────────────────────────────────┘
                              │
                              ▼
┌─────────────────────────────────────────────────────────────┐ 102
│ performing a physical layer transmission processing of a    │
│ to-be-transmitted uplink service data and the A-CSI report  │
│ on a PUSCH                                                  │
└─────────────────────────────────────────────────────────────┘
``` transmission processing of a to-be-transmitted uplink service data and the A-CSI report on a PUSCH determined based on the at least one piece of resource indication information.

18 Claims, 3 Drawing Sheets

(58) Field of Classification Search
CPC ............ H04L 5/0092; H04W 72/1268; H04W 72/1289; H04W 72/042; H04W 72/12; H04W 72/1231; H04W 72/1284; H04W 72/0446; H04W 72/085; H04W 74/0866; H04W 72/1205; H04B 7/0626
See application file for complete search history.

(56) References Cited

U.S. PATENT DOCUMENTS

| | | | | |
|---|---|---|---|---|
| 2019/0349964 | A1* | 11/2019 | Liou | ............ H04L 5/001 |
| 2020/0178220 | A1 | 6/2020 | Kang et al. | |
| 2020/0374730 | A1* | 11/2020 | Gao | ............ H04L 1/0026 |

FOREIGN PATENT DOCUMENTS

| | | |
|---|---|---|
| JP | 2020523855 A | 8/2020 |
| WO | 2015174328 A1 | 11/2015 |
| WO | 2017136706 A1 | 8/2017 |
| WO | 2018230911 A1 | 12/2018 |

OTHER PUBLICATIONS

R1-1720665 'Remaining Details on CSI Framework' 6 Pages.
R1-1721527 'WF on CSI timing offset for PUSCH' 6 Pages.
R1-1800184 'Remaining Issues and text proposals on CSI reporting' 11 Pages.
Extended European Search Report dated Dec. 14, 2020 issued in PCT/CN2018/124236.
3GPP TSG RAN WG1 Meeting #89, R1-1707607, Hangzhou, China May 15-19, 2017, "Discussion on CSI framework", 7 pages.
3GPP TSG RAN WG1 Meeting #90, R1-1714327, Prague, Czech Republic, Aug. 21-25, 2017, "UE-specific DCI contents in NR", 7 pages.
3GPP TSG RAN WG1 Meeting #90bis, R1-1718481, Prague, Czech Republic, Oct. 9-13, 2017, "Remaining issues on CSI reporting", 4 pages.
3GPP TSG RAN WG1 Meeting #90bis, R1-1718544, Prague, Czech, Oct. 9-13, 2017, "Details of CSI framework", 6 pages.
International Preliminary Report on Patentability and Written Opinion dated Jul. 23, 2020 issued in PCT/CN2018/124236.
Second Office Action for Japanese Application No. 2020-538044, dated Jun. 13, 2022, 5 Pages.
Communication Pursuant to Art. 94(3) EPC for European Application No. 18 899 266.3-1215, dated Jun. 20, 2022, 11 Pages.
LG Electronics, "Discussion on CSI Framework," 3GPP TSG RAN WG1 NR Ad-Hoc#2, Agenda item 5.1.2.3.1, Jun. 27-30, 2017, R1-1710284, Qingdao, China, 7 Pages.

* cited by examiner

TRANSMISSION METHOD, MOBILE TERMINAL AND NETWORK DEVICE

CROSS REFERENCE OF RELATED APPLICATION

The present application is the U.S. national phase of PCT Application PCT/CN2018/124236 filed on Dec. 27, 2018, which claims a priority of Chinese patent application No. 201810031713.2 filed on Jan. 12, 2018, which is incorporated herein by reference in its entirety.

TECHNICAL FIELD

The present disclosure relates to the field of communications technologies, and in particular, to a transmission method, a mobile terminal and a network device.

BACKGROUND

In the related art, the uplink service data may be scheduled by Downlink Control Information (DCI), which is transmitted on a Physical Uplink Shared Channel (PUSCH). The time domain PUSCH resource field in the DCI indicates a row number in the RRC configuration table, where each row defines information such as an uplink slot offset value and a start-and-length indicator value (SLIV) of the PUSCH transmission time and the DCI scheduling time. The setting of the uplink slot offset mainly takes into account the processing time of the mobile terminal.

An Aperiodic-Channel State Information (A-CSI) report may be triggered by the CSI request field in the DCI (Format 0-1), the A-CSI report is transmitted in the PUSCH. A plurality of values of the slot offset between the CSI reporting time and the DCI triggering time of the A-CSI report are configured by a Radio Resource Control (RRC) signaling and a specific time interval is indicated in the triggering DCI of the A-CSI. When A-CSI contains $N_{Rep} \geq 1$ CSI reports, let $Y_{i,j}$ be the $i^{th}$ available slot offset value of the slot offset configured by the $j^{th}$ report configuration (j=0, ..., $N_{Rep}-1$), and then the $i^{th}$ slot offset value in the field indicating the slot offset in the DCI is $Y_i = \max_j Y_{i,j}$.

However, when the A-CSI report is introduced, the DCI can schedule the uplink service data transmission and trigger the A-CSI report at the same time, and the indicated slot offset for PUSCH transmission may be inconsistent. Therefore, how to process the uplink service data transmission and trigger the A-CSI report has not been specified for this case. Therefore, it is necessary to standardize the processing when the DCI schedules the uplink service data transmission and trigger the A-CSI report at the same time.

SUMMARY

In a first aspect, a transmission method for a mobile terminal is provided in an embodiment of the present disclosure, including:

receiving Downlink Control Information (DCI) sent by a network side, where the DCI is configured to indicate a scheduling of an uplink service data and indicate to report an Aperiodicity-Channel State Information (A-CSI) report;

performing a physical layer transmission processing of a to-be-transmitted uplink service data and the A-CSI report on a Physical Uplink Shared Channel (PUSCH);

where the DCI carries at least one piece of resource indication information, and the PUSCH is determined according to the at least one piece of resource indication information.

In a second aspect, a transmission method for a network device is further provided in an embodiment of the present disclosure, including:

sending, to a mobile terminal, Downlink Control Information (DCI) configured to indicate a scheduling of an uplink service data and indicate to report an Aperiodicity-Channel State Information (A-CSI) report;

performing a reception processing of the uplink service data and the A-CSI report on a Physical Uplink Shared Channel (PUSCH);

where the DCI carries at least one piece of resource indication information, and the PUSCH is determined according to the at least one piece of resource indication information.

In a third aspect, a mobile terminal is further provided in an embodiment of the present disclosure, including:

a receiving module, configured to receive Downlink Control Information (DCI) sent by a network side, where the DCI is configured to indicate a scheduling of an uplink service data and indicate to report an Aperiodicity-Channel State Information (A-CSI) report;

a transmission processing module, configured to perform a physical layer transmission processing of a to-be-transmitted uplink service data and the A-CSI report on a Physical Uplink Shared Channel (PUSCH);

where the DCI carries at least one piece of resource indication information, and the PUSCH is determined according to the at least one piece of resource indication information.

In a fourth aspect, a network device is further provided in an embodiment of the present disclosure, including:

a sending module, configured to send, to a mobile terminal, Downlink Control Information (DCI) configured to indicate a scheduling of an uplink service data and indicate to report an Aperiodicity-Channel State Information (A-CSI) report;

a reception processing module, configured to perform a reception processing of the uplink service data and the A-CSI report on a Physical Uplink Shared Channel (PUSCH);

where the DCI carries at least one piece of resource indication information, and the PUSCH is determined according to the at least one piece of resource indication information.

In a fifth aspect, a mobile terminal is further provided in an embodiment of the present disclosure, including a processor, a memory and a computer program stored in the memory and executable on the processor, where the processor executes the computer program to perform the transmission method hereinabove.

In a sixth aspect, a network device is further provided in an embodiment of the present disclosure, including a processor, a memory and a computer program stored in the memory and executable on the processor, where the processor executes the computer program to perform the transmission method hereinabove.

In a seventh aspect, a computer readable storage medium is further provided in an embodiment of the present disclosure, where a computer program is stored in the computer readable storage medium, and a processor executes the computer program to perform the transmission method hereinabove.

In an eighth aspect, a computer readable storage medium is further provided in an embodiment of the present disclosure, where a computer program is stored in the computer

DETAILED DESCRIPTION

In order that the technical solution of the embodiments of the present disclosure may be described more clearly, reference will now be made to the drawings, which are intended to be used in the embodiments of the present disclosure. It will be apparent that the drawings in the following description are merely some of the embodiments of the present disclosure, and other drawings may be made to those skilled in the art without creative work.

Figure 1:
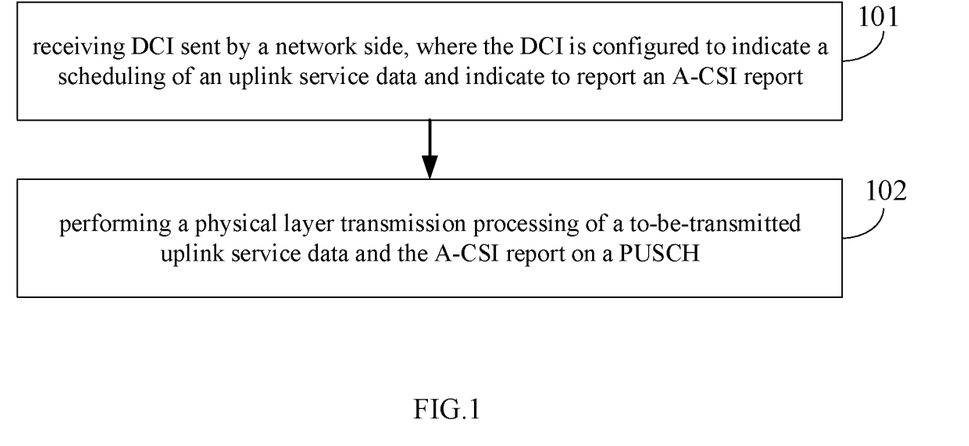
FIG. 1 is a flowchart of a transmission method in an embodiment of the present disclosure.

Referring to FIG. 1, a transmission method for a mobile terminal is provided in an embodiment of the present disclosure, including:

Step 101: receiving Downlink Control Information (DCI) sent by a network side, where the DCI is configured to indicate a scheduling of an uplink service data and indicate to report an Aperiodicity-Channel State Information (A-CSI) report.

Specifically, the DCI carries at least one piece of resource indication information which may correspond to the uplink service data, or to the A-CSI report, or to both the uplink service data and the A-CSI report.

Step 102: performing a physical layer transmission processing of a to-be-transmitted uplink service data and the A-CSI report on a Physical Uplink Shared Channel (PUSCH).

It should be noted that the PUSCH is determined according to the at least one piece of resource indication information carried in the DCI.

In some embodiments of the present disclosure, the PUSCH is used to perform the transmission processing of the uplink service data and the A-CSI report at the same time. For the uplink service data, three cases are included, as follows:

there is no transmission requirement for uplink service data at present;

there is a transmission requirement of uplink service data at present and the transmission requirement of uplink service data has been generated;

there is a transmission requirement of uplink service data at present, but the data processing is not complete (e.g., coding is not complete).

For each of the above cases, at the terminal level, if uplink service data is to be transmitted at the physical layer, it indicates that there is a transmission requirement of uplink service data currently and the transmission requirement has been generated. If uplink service data is not to be transmitted at the physical layer, there may be no transmission requirement of uplink service data at the physical layer, or there may be a transmission requirement of uplink service data at the physical layer, but the data processing has not been completed.

Therefore, the transmission processing of the to-be-transmitted uplink service data of the physical layer in some embodiments of the present disclosure may be various cases as follows:

If uplink service data is to be transmitted at the physical layer, data is transmitted by the determined PUSCH, and if uplink service data is not to be transmitted at the physical layer, the transmission of the current service data is discarded.

According to the transmission method in the embodiment of the present disclosure, by receiving the DCI sent by the network side and configured to indicate the scheduling of the uplink service data and the report of the A-CSI report, where the DCI carries at least one piece of resource indication information, and performing a physical layer transmission processing of a to-be-transmitted uplink service data and the A-CSI report on a PUSCH determined based on the at least one piece of resource indication information, it is able to determine how to transmit the uplink service data and the A-CSI report when the uplink service data transmission and the triggering of the A-CSI report are simultaneously scheduled in one DCI.

In some embodiments of the present disclosure, the DCI may carry one piece of resource indication information, or may carry two pieces of resource indication information, and the PUSCH determined according to the resource indication information may be one or two, which are described in detail below.

Generally, the same RRC configuration table is stored on both the network side and the mobile terminal side, and the mobile terminal may determine the time domain resource used for transmitting the PUSCH based on the configuration table and the resource indication information. In some embodiments of the present disclosure, the scheduling of the uplink service data and the reporting of the A-CSI report may use respective RRC configuration tables, or may use the same RRC configuration table, which will be described in detail below.

When the scheduling of the uplink service data and reporting of the A-CSI report uses the respective RRC configuration tables, both the network side and the mobile terminal side store two RRC configuration tables, which may include at least the following fields as shown in Table 1 and Table 2 below:

a serial number field for recording resource indication information;

a slot offset field for recording a corresponding slot offset value;

a slot start symbol field for recording a start symbol of a scheduled PUSCH; and a length field for recording the length of the scheduled PUSCH.

where Table 1 corresponds to an RRC configuration table for scheduling the uplink service data, which is as follows:

TABLE 1

| serial number | slot offset K | start symbol S, length L in slot | other information (e.g., mapping type, etc.) |
|---|---|---|---|
| 1 | $K_{2,0}$ | $[S_1 L_1]$ | ... |
| ... | ... | ... | ... |
| N1 | $K_{2,0}$ | $[S_{N1} L_{N1}]$ | ... |
| N1 + 1 | $K_{2,1}$ | $[S_1 L_1]$ | ... |
| ... | ... | ... | ... |
| N1 + N2 | $K_{2,1}$ | $[S_{N2} L_{N2}]$ | ... |
| N1 + N2 + 1 | $K_{2,2}$ | $[S_1 L_1]$ | ... |
| ... | ... | ... | ... |
| N1 + N2 + N3 | $K_{2,2}$ | $[S_{N3} L_{N3}]$ | ... |

Table 2 corresponds to the RRC configuration table for reporting the A-CSI report, which is as follows:

TABLE 2

| serial number | slot offset Y | start symbol S, length L in slot | other information (e.g., mapping type, etc.) |
|---|---|---|---|
| 1 | $Y_0$ | $[S_1 L_1]$ | ... |
| ... | ... | ... | ... |
| M1 | $Y_0$ | $[S_{M1} L_{M1}]$ | ... |
| M1 + 1 | $Y_1$ | $[S_1 L_1]$ | ... |
| ... | ... | ... | ... |
| M1 + M2 | $Y_1$ | $[S_{M2} L_{M2}]$ | ... |
| M1 + M2 + 1 | $Y_2$ | $[S_1 L_1]$ | ... |
| ... | ... | ... | ... |
| M1 + M2 + M3 | $Y_2$ | $[S_{M3} L_{M3}]$ | ... |

The resource indication information carried in the DCI transmitted by the network side is the value of the above serial number field. After acquiring the value of the resource indication information, the mobile terminal may acquire the slot offset value, the slot start symbol, and the length of the scheduled PUSCH through the corresponding RRC configuration table.

In some embodiments of the present disclosure, when there are two pieces of resource indication information, the corresponding slot offsets K and Y may be respectively acquired from the corresponding configuration table, and then a target PUSCH is determined according to one of the K and Y to process the transmission of the uplink service data and the A-CSI report at the same time, or two different PUSCHs are determined according to K and Y to transmit the uplink service data and the A-CSI report respectively. This will be described in detail below.

Case 1

In case 1, the DCI carries first resource indication information corresponding to the uplink service data and second resource indication information corresponding to the A-CSI report, the first resource indication information corresponds to a first slot offset value K, and the second resource indication information corresponds to a second slot offset value Y.

At this time, the mobile terminal may perform the physical layer transmission processing of the to-be-transmitted uplink service data and the A-CSI report on a target PUSCH determined according to one of K and Y, for example, according to a larger one of K and Y.

Case 2

In case 2, the DCI carries first resource indication information corresponding to the uplink service data and second resource indication information corresponding to the A-CSI report, the first resource indication information corresponds to a first slot offset value K, and the second resource indication information corresponds to a second slot offset value Y.

At this time, when K and Y are different, the mobile terminal may transmit the to-be-transmitted uplink service data on the first target PUSCH corresponding to K, and transmit a corresponding A-CSI report through the second target PUSCH corresponding to Y.

When K and Y are the same, the mobile terminal may transmit the to-be-transmitted uplink service data and the A-CSI report on the target PUSCH corresponding to K (i.e., Y).

In some embodiments of the present disclosure, when there is only one piece of resource indication information, the scheduling of the uplink service data and reporting of the A-CSI report may use the same RRC configuration table, and the RRC configuration table has the following three implementations, which are specifically described as follows.

Manner 1

In Manner 1, a configuration table recording all slot offset values corresponding to the uplink service data and all slot offset values corresponding to the A-CSI report is stored in the network side and the mobile terminal side, as shown in Table 3 below. In a specific application, the network side may notify, through a RRC signaling, the mobile terminal to select part of the rows in the configuration table to determine the corresponding PUSCH for the transmission processing.

TABLE 3

| serial number | slot offset | start symbol S, length L in slot | other information (e.g., mapping type, etc.) |
|---|---|---|---|
| 1 | $K_{2,0}$ | $[S_1 L_1]$ | ... |
| ... | ... | ... | ... |
| N1 | $K_{2,0}$ | ... | ... |
| N1 + 1 | $K_{2,1}$ | ... | ... |
| ... | ... | ... | ... |
| N1 + N2 | $K_{2,1}$ | ... | ... |
| N1 + N2 + 1 | $K_{2,2}$ | ... | ... |
| ... | ... | ... | ... |
| N1 + N2 + N3 | $K_{2,2}$ | ... | ... |
| N1 + N2 + N3 + 1 | $Y_0$ | ... | ... |
| ... | ... | ... | ... |
| N1 + N2 + N3 + M1 | $Y_0$ | ... | ... |
| N1 + N2 + N3 + M1 + 1 | $Y_1$ | ... | ... |
| ... | ... | ... | ... |
| N1 + N2 + N3 + M1 + M2 | $Y_1$ | ... | ... |
| N1 + N2 + N3 + M1 + M2 + 1 | $Y_2$ | ... | ... |
| ... | ... | ... | ... |
| N1 + N2 + N3 + M1 + M2 + M3 | $Y_2$ | ... | ... |

When the mobile terminal receives the unique resource indication information, a corresponding slot offset value, possibly a K value or a Y value, may be obtained from the RRC configuration table above, and a target PUSCH is determined according to the obtained slot offset K or Y, and the transmission of the uplink service data and the A-CSI report is simultaneously processed according to the target PUSCH.

That is, in this manner, the DCI carries only one piece of fourth resource indication information corresponding to a fourth slot offset value K or Y. At this time, the mobile terminal may perform the physical layer transmission processing of the to-be-transmitted uplink service data and the A-CSI report on a target PUSCH. The target PUSCH is determined according to K or Y.

It should be understood that Table 3 above is an example where the values of K and Y are different, and when the values of K and Y are the same, the corresponding rows will be merged.

Manner 2

In manner 2, the network side and the mobile terminal side store a configuration table that holds all possible slot offset value pairs consisting of K and Y, as shown in Table 4 below. In a specific application, the network side may notify the mobile terminal to select part of the rows in the configuration table through the RRC signaling to determine the corresponding PUSCH for the transmission processing.

TABLE 4

| serial number | slot offset K | slot offset Y | start symbol S, length L in slot | other information (e.g., mapping type, etc.) |
|---|---|---|---|---|
| 1 | $K_{2,0}$ | $Y_0$ | ... | ... |
| ... | ... | ... | ... | ... |
|  | $K_{2,0}$ | $Y_1$ | ... | ... |
| ... | ... | ... | ... | ... |
| ... | $K_{2,0}$ | $Y_2$ | ... | ... |
| ... | ... | ... | ... | ... |
|  | $K_{2,1}$ | $Y_0$ | ... | ... |
| ... | ... | ... | ... | ... |
|  | $K_{2,1}$ | $Y_1$ | ... | ... |
| ... | ... | ... | ... | ... |
| ... | $K_{2,1}$ | $Y_2$ | ... | ... |
| ... | ... | ... | ... | ... |
|  | $K_{22}$ | $Y_0$ | ... | ... |
| ... | ... | ... | ... | ... |
|  | $K_{2,2}$ | $Y_1$ | ... | ... |
| ... | ... | ... | ... | ... |
|  | $K_{2,2}$ | $Y_2$ | ... | ... |

In this case, when the mobile terminal receives the unique resource indication information, the corresponding slot offsets K and Y can be obtained from the RRC configuration table described above. When the mobile terminal finds that there is only the requirement for the uplink service data transmission at present, a corresponding slot offset K is used to determine a target PUSCH for processing the transmission of uplink service data. When the mobile terminal finds there is only requirement of reporting the A-CSI report at present, the corresponding slot offset Y is used to determine a target PUSCH for processing the reporting of the A-CSI report. When both requirements exist at the same time, a target PUSCH may be determined based on one of K and Y (e.g., the larger one) to simultaneously process the transmission of uplink service data and the A-CSI report.

That is, in this manner, the DCI carries only one piece of third resource indication information corresponding to a slot offset value pair including a first slot offset value K corresponding to the uplink service data and a second slot offset value Y corresponding to the A-CSI report. At this time, the mobile terminal may perform the physical layer transmission processing of the to-be-transmitted uplink service data and the A-CSI report on a target PUSCH. The target PUSCH is determined according to one of K and Y, for example, according to the larger one of K and Y.

In the above manner, when both requirements exist at the same time, the mobile terminal decides which one of K and Y is used, and that may also be determined according to the pre-set RRC configuration table, for example, the RRC configuration table in the following manner 3.

Manner 3

In manner 3, the format of the RRC configuration table is identical to the format of the RRC configuration table in manner 2, excepting that the values thereof are different, as shown in the following table 5. In a specific application, the network side may notify, through RRC signaling, the mobile terminal to select part of the rows in the configuration table to determine the corresponding PUSCH for the transmission processing.

TABLE 5

| serial number | slot offset 1 | slot offset 2 | start symbol S, length L in slot | other information (e.g., mapping type, etc.) |
|---|---|---|---|---|
| 1 | $K_{2,0}$ | larger one of $K_{2,0}$ and $Y_0$ | ... | ... |
| ... | ... | ... | ... | ... |
|  | $K_{2,0}$ | larger one of $K_{2,0}$ and $Y_1$ | ... | ... |
| ... | ... | ... | ... | ... |
| ... | $K_{2,0}$ | larger one of $K_{2,0}$ and $Y_2$ | ... | ... |
| ... | ... | ... | ... | ... |
|  | $K_{2,1}$ | larger one of $K_{2,1}$ and $Y_0$ | ... | ... |
| ... | ... | ... | ... | ... |
|  | $K_{2,1}$ | larger one of $K_{2,1}$ and $Y_1$ | ... | ... |
| ... | ... | ... | ... | ... |
|  | $K_{2,1}$ | larger one of $K_{2,1}$ and $Y_2$ | ... | ... |
| ... | ... | ... | ... | ... |
|  | $K_{2,2}$ | larger one of $K_{2,2}$ and $Y_0$ | ... | ... |
| ... | ... | ... | ... | ... |
|  | $K_{2,2}$ | larger one of $K_{2,2}$ and $Y_1$ | ... | ... |
| ... | ... | ... | ... | ... |
| ... | $K_{2,2}$ | larger one of $K_{2,2}$ and $Y_2$ | ... | ... |

Table 5 is used as an example for illustration.

In the RRC configuration table shown in Table 5, the slot offset 1 is defined to be used when the A-CSI report trigger indication is not included in the DCI, and the slot offset 2 is defined to be used when the A-CSI report trigger indication is included in the DCI.

In the RRC configuration table shown in Table 5, the slot offset 2 is defined to be used when the A-CSI report trigger indication is included in the DCI, and the value thereof is the larger one of the slot offset value corresponding to the to-be-transmitted uplink service data and the slot offset value corresponding to the A-CSI report, so as to ensure normal reporting of the A-CSI report.

In this case, when the mobile terminal receives a unique resource indication information, the corresponding slot offset 1 and slot offset 2 may be obtained from the RRC configuration table described above. When the mobile terminal finds that there is only the requirement for transmitting the uplink service data, a corresponding slot offset 1 is used to determine a target PUSCH for processing the transmission of uplink service data. In other cases, that is, there is only the requirement of reporting the A-CSI report, or both the requirement of transmitting the uplink service data and the requirement of reporting the A-CSI report, the slot offset 2 is used to determine a target PUSCH for the corresponding transmission processing. Since the slot offset 2 is the larger one of the slot offset value corresponding to the to-be-transmitted uplink service data and the slot offset value corresponding to the A-CSI report, the normal reporting of the A-CSI report may be ensured.

Specifically, in this manner, the DCI carries only one piece of fifth resource indication information corresponding to a slot offset value pair including a fifth slot offset value used in the case that the DCI does not include an A-CSI report trigger indication and a sixth slot offset value used in the case that the DCI includes an A-CSI report trigger indication, the sixth slot offset value is greater than or equal to the fifth slot offset value. At this time, the mobile terminal may perform the physical layer transmission processing of the to-be-transmitted uplink service data and the A-CSI report on a target PUSCH. The target PUSCH is determined according to the sixth slot offset value.

The sixth slot offset value is the larger one of the slot offset value corresponding to the to-be-transmitted uplink service data and the slot offset value corresponding to the A-CSI report.

In some or all of the above embodiments of the present disclosure, a target PUSCH is determined based on a slot offset value, and a target PUSCH is used to perform the transmission processing of to-be-transmitted uplink service data and the A-CSI report of the physical layer.

For the A-CSI report, from the reception of the indication to the generation of the A-CSI report, the reference signal is received and then decoded and a calculation is performed, which needs a certain period of time. Therefore, the A-CSI report may not be generated before the determined slot offset, or the A-CSI report may be generated in this case.

Therefore, after the target PUSCH is determined, the A-CSI report includes two cases: 1. the A-CSI report that can be generated according to the CSI reference resource or the target reference signal; 2. the A-CSI report that cannot be generated according to a CSI reference resource or a target reference signal.

In the first case, the generated A-CSI report can be directly transmitted, while in the second case, processing may be performed in a plurality of ways:

Mode 1: canceling the transmission of the A-CSI report;

Mode 2: notifying the network side that the A-CSI report is not sent, while canceling transmission of the A-CSI report, so as to prevent the network side from performing an unnecessary detection operation.

Mode 3: using a historical A-CSI report instead.

That is, in some embodiments of the present disclosure, when performing the physical layer transmission processing of the to-be-transmitted uplink service data and the A-CSI report on the target PUSCH, the to-be-transmitted uplink service data and a preset data of the physical layer may be transmitted through the target PUSCH, where the preset data is one of: the A-CSI report generated based on a CSI reference resource or a target reference signal, a historical A-CSI report, or indication information indicating that the A-CSI report is not sent; or the to-be-transmitted uplink service data of the physical layer is transmitted through the target PUSCH, and a transmission of the A-CSI report is cancelled.

The mobile terminal may determine whether the A-CSI report can be generated according to the CSI reference resource or the target reference signal according to the following method.

1) reporting the latest A-CSI report;

assuming that the slot offset value is T, if the DCI indicates that the A-CSI report is associated with a periodic CSI-RS (P-CSI-RS) or a semi-persistent CSI-RS (SP-CSI-RS), then when T is greater than or equal to Z (the time at which the A-CSI report is calculated from the signal), it is determined that the latest A-CSI report can be reported;

if the DCI indicates that the A-CSI report is associated with an aperiodic CSI-RS (A-CSI-RS), it is determined that the latest A-CSI report can be reported when T is greater than or equal to a sum of X (the transmission time interval of DCI and A-CSI-RS) and Z.

In other cases, it is indicated that the latest A-CSI report cannot be reported, and only one of the following operations can be used: canceling transmission of the A-CSI report; notifying the network side that the A-CSI report is not sent, while canceling the transmission of the A-CSI report, so as to prevent the network side from performing an unnecessary detection operation or using the historical A-CSI report instead.

As described hereinabove, the A-CSI report may be associated with a periodic CSI-RS (P-CSI-RS) or a semi-persistent CSI-RS (SP-CSI-RS), and may also be associated with an aperiodic CSI-RS (A-CSI-RS). In some embodiments of the present disclosure, the historical A-CSI report used instead may be:

an A-CSI report based on a type of the reference signal the same as the type of the reference signal which the current A-CSI report is based on;

Alternatively, the latest one of all historical A-CSI reports according to any type of reference signal.

That is, the historical A-CSI report may be based on the period CSI-RS, the semi-persistent CSI-RS or the aperiodic CSI-RS, and the historical A-CSI report may be based on the same type of reference signal. If it is too early, the closest one may be selected, and of course, other strategies may be adopted, which are not described one by one herein.

Figure 2:
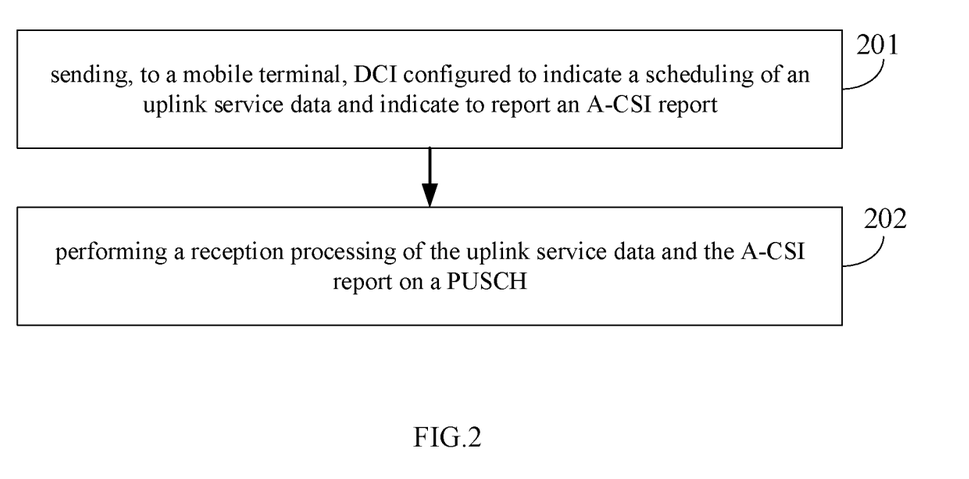
FIG. 2 is a flowchart of another transmission method in an embodiment of the present disclosure.

Referring to FIG. 2, a transmission method for a network device is further provided in an embodiment of the present disclosure, including the following steps:

Step 201: sending, to a mobile terminal, Downlink Control Information (DCI) configured to indicate a scheduling of an uplink service data and indicate to report an Aperiodicity-Channel State Information (A-CSI) report.

Step 202: performing a reception processing of the uplink service data and the A-CSI report on a Physical Uplink Shared Channel (PUSCH).

The DCI carries at least one piece of resource indication information, and the PUSCH is determined according to the at least one piece of resource indication information.

According to the transmission method in the embodiment of the present disclosure, by sending to a mobile terminal DCI configured to indicate a scheduling of an uplink service data and a report of an A-CSI report, where the DCI carries at least one piece of resource indication information, and performing a reception processing of the uplink service data and the A-CSI report on a PUSCH determined based on the at least one piece of resource indication information, it is able to determine how to transmit the uplink service data and the A-CSI report when the uplink service data transmission and the triggering of the A-CSI report are simultaneously scheduled in one DCI.

In the embodiment of the present disclosure, the DCI carries first resource indication information corresponding to the uplink service data and second resource indication information corresponding to the A-CSI report; the first resource indication information corresponds to a first slot offset value, and the second resource indication information corresponds to a second slot offset value, Step 202 includes:

performing the reception processing of the uplink service data and the A-CSI report on a target PUSCH;

where the target PUSCH is determined according to one of the first slot offset value and the second slot offset value.

Optionally, the DCI carries only one piece of third resource indication information corresponding to a slot offset value pair including a first slot offset value corresponding to the uplink service data and a second slot offset value corresponding to the A-CSI report, Step 202 includes:

performing the reception processing of the uplink service data and the A-CSI report on a target PUSCH;

where the target PUSCH is determined according to one of the first slot offset value and the second slot offset value.

Further, the target PUSCH is determined according to a larger one of the first slot offset value and the second slot offset value.

Optionally, the DCI carries only one piece of fourth resource indication information corresponding to a fourth slot offset value, Step 202 includes:

performing the reception processing of the uplink service data and the A-CSI report on a target PUSCH;

where the target PUSCH is determined according to the fourth slot offset value.

Further, a configuration table recording all slot offset values corresponding to the uplink service data and all slot offset values corresponding to the A-CSI report is stored in the network device; prior to Step 201, the method further includes:

determining a first slot offset value corresponding to the uplink service data and a second slot offset value corresponding to the A-CSI report respectively;

determining the fourth resource indication information from the configuration table based on a larger one of the first slot offset value and the second slot offset value.

Optionally, the DCI carries only one piece of fifth resource indication information corresponding to a slot offset value pair including a fifth slot offset value used in the case that the DCI does not include an A-CSI report trigger indication and a sixth slot offset value used in the case that the DCI includes an A-CSI report trigger indication, the sixth slot offset value is greater than or equal to the fifth slot offset value; Step 202 includes:

performing the reception processing of the uplink service data and the A-CSI report on a target PUSCH;

where the target PUSCH is determined according to the sixth slot offset value.

Optionally, the DCI carries first resource indication information corresponding to the uplink service data and second resource indication information corresponding to the A-CSI report, the first resource indication information corresponds to a first slot offset value, and the second resource indication information corresponds to a second slot offset value; Step 202 includes:

receiving the uplink service data through a first target PUSCH corresponding to the first slot offset value and receiving the A-CSI report through a second target PUSCH corresponding to the second slot offset value, in the case that the first slot offset value and the second slot offset value are different; or receiving the uplink service data and the A-CSI report through a target PUSCH corresponding to the first slot offset value, in the case that the first slot offset value and the second slot offset value are the same.

The above-described embodiment describes the transmission method of the present disclosure, and the mobile terminal and the network device of the present disclosure will be described with reference to the embodiments and the drawings.

Figure 3:
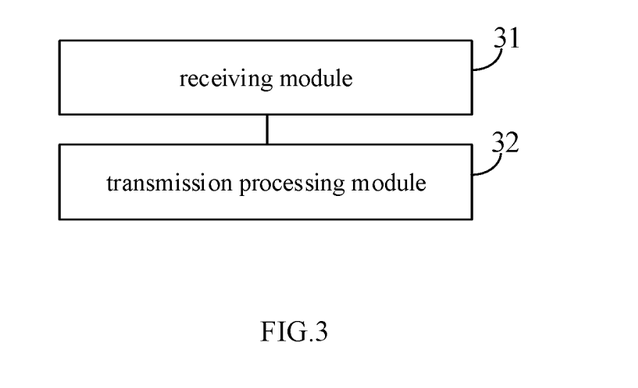
FIG. 3 is a first schematic structural diagram of a mobile terminal in an embodiment of the present disclosure.

Referring to FIG. 3, a mobile terminal is further provided in an embodiment of the present disclosure, including:

a receiving module 31, configured to receive Downlink Control Information (DCI) sent by a network side, where the DCI is configured to indicate a scheduling of an uplink service data and indicate to report an Aperiodicity-Channel State Information (A-CSI) report;

a transmission processing module 32, configured to perform a physical layer transmission processing of a to-be-transmitted uplink service data and the A-CSI report on a Physical Uplink Shared Channel (PUSCH);

where the DCI carries at least one piece of resource indication information, and the PUSCH is determined according to the at least one piece of resource indication information.

According to the mobile terminal in the embodiment of the present disclosure, by receiving the DCI sent by the network side and configured to indicate the scheduling of the uplink service data and the report of the A-CSI report, where the DCI carries at least one piece of resource indication information, and performing a physical layer transmission processing of a to-be-transmitted uplink service data and the A-CSI report on a PUSCH determined based on the at least one piece of resource indication information, it is able to determine how to transmit the uplink service data and the A-CSI report when the uplink service data transmission and the triggering of the A-CSI report are simultaneously scheduled in one DCI.

Optionally, the DCI carries first resource indication information corresponding to the uplink service data and second resource indication information corresponding to the A-CSI report, the first resource indication information corresponds to a first slot offset value, and the second resource indication information corresponds to a second slot offset value;

the transmission processing module 32 is further configured to:

perform the physical layer transmission processing of the to-be-transmitted uplink service data and the A-CSI report on a target PUSCH;

where the target PUSCH is determined according to one of the first slot offset value and the second slot offset value.

Optionally, the DCI carries only one piece of third resource indication information corresponding to a slot offset value pair including a first slot offset value corresponding to the uplink service data and a second slot offset value corresponding to the A-CSI report;

the transmission processing module 32 is further configured to:

perform the physical layer transmission processing of the to-be-transmitted uplink service data and the A-CSI report on a target PUSCH;

where the target PUSCH is determined according to one of the first slot offset value and the second slot offset value.

Optionally, the target PUSCH is determined according to a larger one of the first slot offset value and the second slot offset value.

Optionally, the DCI carries only one piece of fourth resource indication information corresponding to a fourth slot offset value;

the transmission processing module 32 is further configured to:

perform the physical layer transmission processing of the to-be-transmitted uplink service data and the A-CSI report on a target PUSCH;

where the target PUSCH is determined according to the fourth slot offset value.

Optionally, the DCI carries only one piece of fifth resource indication information corresponding to a slot offset value pair including a fifth slot offset value used in the case that the DCI does not include an A-CSI report trigger indication and a sixth slot offset value used in the case that the DCI includes an A-CSI report trigger indication, the sixth slot offset value is greater than or equal to the fifth slot offset value;

the transmission processing module 32 is further configured to:

perform the physical layer transmission processing of the to-be-transmitted uplink service data and the A-CSI report on a target PUSCH;

where the target PUSCH is determined according to the sixth slot offset value.

Optionally, the transmission processing module 32 is further configured to:

transmit the to-be-transmitted uplink service data and a preset data on the target PUSCH, where the preset data is one of:

the A-CSI report generated based on the a CSI reference resource or a target reference signal, a historical A-CSI report, or indication information indicating that the A-CSI report is not sent; or transmit the to-be-transmitted uplink service data on the target PUSCH, and cancel a transmission of the A-CSI report.

Optionally, the DCI carries first resource indication information corresponding to the uplink service data and second resource indication information corresponding to the A-CSI report, the first resource indication information corresponds to a first slot offset value, and the second resource indication information corresponds to a second slot offset value;

the transmission processing module 32 is further configured to:

transmit the to-be-transmitted uplink service data on a first target PUSCH corresponding to the first slot offset value and transmit the A-CSI report through a second target PUSCH corresponding to the second slot offset value, in the case that the first slot offset value and the second slot offset value are different; or transmit the to-be-transmitted uplink service data and the A-CSI report on the target PUSCH corresponding to the first slot offset value (i.e., the second slot offset value), in the case that the first slot offset value and the second slot offset value are the same.

Figure 4:
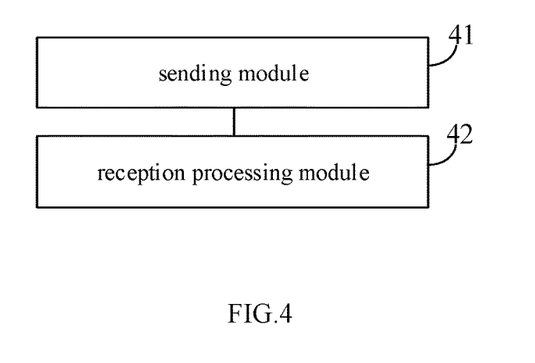
FIG. 4 is a first schematic structural diagram of a network device in an embodiment of the present disclosure.

Referring to FIG. 4, a network device is further provided in an embodiment of the present disclosure, including:

a sending module 41, configured to send, to a mobile terminal, Downlink Control Information (DCI) configured to indicate a scheduling of an uplink service data and indicate to report an Aperiodicity-Channel State Information (A-CSI) report;

a reception processing module 42, configured to perform a reception processing of the uplink service data and the A-CSI report on a Physical Uplink Shared Channel (PUSCH);

where the DCI carries at least one piece of resource indication information, and the PUSCH is determined according to the at least one piece of resource indication information.

According to the network device in the embodiment of the present disclosure, by sending to a mobile terminal DCI configured to indicate a scheduling of an uplink service data and a report of an A-CSI report, where the DCI carries at least one piece of resource indication information, and performing a reception processing of the uplink service data and the A-CSI report on a PUSCH determined based on the at least one piece of resource indication information, it is able to determine how to transmit the uplink service data and the A-CSI report when the uplink service data transmission and the triggering of the A-CSI report are simultaneously scheduled in one DCI.

Optionally, the DCI carries first resource indication information corresponding to the uplink service data and second resource indication information corresponding to the A-CSI report;

the first resource indication information corresponds to a first slot offset value, and the second resource indication information corresponds to a second slot offset value;

the reception processing module 42 is further configured to:

perform the reception processing of the uplink service data and the A-CSI report on a target PUSCH;

where the target PUSCH is determined according to one of the first slot offset value and the second slot offset value.

Optionally, the DCI carries only one piece of third resource indication information corresponding to a slot offset value pair including a first slot offset value corresponding to the uplink service data and a second slot offset value corresponding to the A-CSI report;

the reception processing module 42 is further configured to:

perform the reception processing of the uplink service data and the A-CSI report on a target PUSCH;

where the target PUSCH is determined according to one of the first slot offset value and the second slot offset value.

Optionally, the target PUSCH is determined according to a larger one of the first slot offset value and the second slot offset value.

Optionally, the DCI carries only one piece of fourth resource indication information corresponding to a fourth slot offset value;

the reception processing module 42 is further configured to:

perform the reception processing of the uplink service data and the A-CSI report on a target PUSCH;

where the target PUSCH is determined according to the fourth slot offset value.

Optionally, a configuration table recording all slot offset values corresponding to the uplink service data and all slot offset values corresponding to the A-CSI report is stored in the network device;

the network device further includes:

a first determining module, configured to determine a first slot offset value corresponding to the uplink service data and a second slot offset value corresponding to the A-CSI report respectively;

a second determining module, configured to determine the fourth resource indication information from the configuration table based on a larger one of the first slot offset value and the second slot offset value.

Optionally, the DCI carries only one piece of fifth resource indication information corresponding to a slot offset value pair including a fifth slot offset value used in the case that the DCI does not include an A-CSI report trigger indication and a sixth slot offset value used in the case that the DCI includes an A-CSI report trigger indication, the sixth slot offset value is greater than or equal to the fifth slot offset value;

the reception processing module 42 is further configured to:

perform the reception processing of the uplink service data and the A-CSI report on a target PUSCH;

where the target PUSCH is determined according to the sixth slot offset value.

Optionally, the DCI carries first resource indication information corresponding to the uplink service data and second resource indication information corresponding to the A-CSI report, the first resource indication information corresponds to a first slot offset value, and the second resource indication information corresponds to a second slot offset value;

the reception processing module 42 is further configured to:

receive the uplink service data through a first target PUSCH corresponding to the first slot offset value and receive the A-CSI report through a second target PUSCH corresponding to the second slot offset value, in the case that the first slot offset value and the second slot offset value are different; or receive the uplink service data and the A-CSI report through a target PUSCH corresponding to the first slot offset value, in the case that the first slot offset value and the second slot offset value are the same.

A mobile terminal is further provided in an embodiment of the present disclosure, including a processor, a memory and a computer program stored in the memory and executable on the processor, where the processor executes the computer program to perform the transmission method hereinabove, and achieves the same technical effect. To avoid repetition, details are not described herein.

Figure 5:
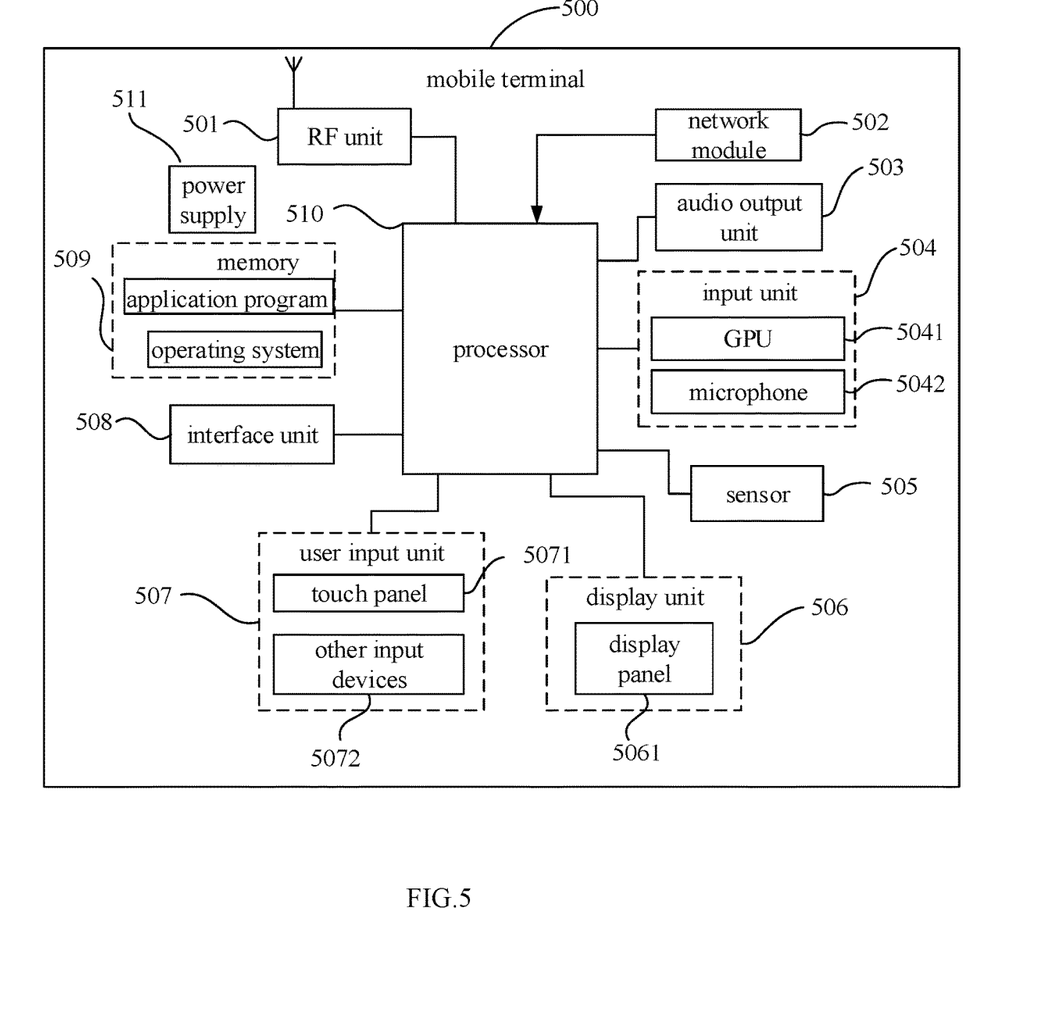
FIG. 5 is a second schematic structural diagram of a mobile terminal in an embodiment of the present disclosure.

Specifically, FIG. 5 is a schematic diagram of a hardware structure of a mobile terminal implementing various embodiments of the present disclosure. The mobile terminal 500 includes, but is not limited to, a radio frequency unit 501, a network module 502, an audio output unit 503, an input unit 504, a sensor 505, a display unit 506, a user input unit 507, an interface unit 508, a memory 509, a processor 510, and a power supply 511. It will be appreciated by those skilled in the art that the terminal structure shown in FIG. 5 does not constitute a limitation on a terminal, and that a mobile terminal may include more or less components than illustrated, or may combine certain components, or different component arrangements. In the disclosed embodiment, the mobile terminal includes, but is not limited to, a mobile phone, a tablet computer, a notebook computer, a palmtop computer, an in-vehicle terminal, an to wear device, a pedometer, and the like.

The radio frequency unit 501 is configured to receive Downlink Control Information (DCI) sent by a network side, where the DCI is configured to indicate a scheduling of an uplink service data and indicate to report an Aperiodicity-Channel State Information (A-CSI) report.

The processor 510 is configured to perform a physical layer transmission processing of a to-be-transmitted uplink service data and the A-CSI report on a Physical Uplink Shared Channel (PUSCH), where the PUSCH is determined according to the at least one piece of resource indication information.

According to the mobile terminal 500 in the embodiment of the present disclosure, by receiving the DCI sent by the network side and configured to indicate the scheduling of the uplink service data and the report of the A-CSI report, where the DCI carries at least one piece of resource indication information, and performing a physical layer transmission processing of a to-be-transmitted uplink service data and the A-CSI report on a PUSCH determined based on the at least one piece of resource indication information, it is able to determine how to transmit the uplink service data and the A-CSI report when the uplink service data transmission and the triggering of the A-CSI report are simultaneously scheduled in one DCI.

It should be understood that in this embodiment of the present disclosure, the radio frequency unit 501 may be configured to receive and transmit signals during receiving and transmitting information or a call. Specifically, the radio frequency unit 501 receives downlink data from a base station and then sends the downlink data to the processor 510 for processing. The uplink data is transmitted to the base station. Generally, the radio frequency unit 501 includes, but is not limited to, an antenna, at least one amplifier, a transceiver, a coupler, a low noise amplifier, a duplexer, and the like. In addition, the radio frequency unit 501 may also communicate with the network and other devices through a wireless communication system.

The mobile terminal provides wireless broadband Internet access to the user through the network module 502, such as assisting the user in receiving and transmitting email, browsing web pages, and accessing streaming media, etc.

The audio output unit 503 may convert the audio data received by the radio frequency unit 501 or the network module 502 or stored in the memory 509 into an audio signal and output as sound. Further, the audio output unit 503 may also provide audio output (e.g., call signal reception sound, message reception sound, etc.) related to a specific function performed by the mobile terminal 500. The audio output unit 503 includes a speaker, a buzzer, a receiver, and the like.

The input unit 504 is adapted to receive an audio or video signal. The input unit 504 may include a Graphics Processing Unit (GPU) 5041, which processes image data of still pictures or videos obtained by an image capturing apparatus (such as a camera) in a video capturing mode or an image capturing mode, and a microphone 5042. The processed image frame may be displayed on the display unit 506. The image frames processed by graphics processor 5041 may be stored in memory 509 (or other storage medium) or transmitted via radio frequency unit 501 or network module 502. The microphone 5042 can receive sound and can process such sound into audio data. The processed audio data may be converted into a format output that may be transmitted to the mobile communication base station via the radio frequency unit 501 in the case of a telephone talk mode.

The mobile terminal 500 also includes at least one sensor 505, such as a light sensor, a motion sensor, and other sensors. Specifically, the light sensor includes an ambient light sensor that can adjust the brightness of the display panel 5061 according to the brightness of the ambient light, and a proximity sensor that can close the display panel 5061 and/or backlight when the mobile terminal 500 moves to the ear. As one type of the motion sensor, the accelerometer sensor can detect the magnitude of the acceleration in each direction (generally three axes), can detect the magnitude and direction of the gravity when stationary, and can be used to recognize the terminal attitude (such as horizontal/vertical screen switching, related games, magnetometer attitude calibration), vibration recognition related functions (such as pedometer, knocking), and the like; The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is used to display information input by or provided to the user. The display unit 506 may include a display panel 5061, which may be configured in the form of a Liquid Crystal Display (LCD), an Organic Light-Emitting Diode (OLED), or the like.

The user input unit 507 may be configured to receive the input number or character information, and to generate a key signal input related to the user setting and the function control of the terminal. Specifically, the user input unit 507 includes a touch panel 5071 and other input devices 5072. The touch panel 5071, also referred to as a touch screen, may collect touch operations on or near the user (e.g., operations on or near the touch panel 5071 using any suitable object or accessory, such as a finger, stylus, or the like). The touch panel 5071 may include both a touch detection device and a touch controller, the touch detection means detects a touch orientation of the user, detects a signal brought about by the touch operation, and transmits the signal to the touch controller. The touch controller receives touch information from the touch detection device and converts the touch information into contact coordinates, and sends the contact coordinates to the processor 510 to receive and execute commands sent from the processor 510. In addition, the touch panel 5071 may be implemented in various types such as a resistive type, a capacitive type, an infrared ray, and a surface acoustic wave. In addition to the touch panel 5071, the user input unit 507 may include other input devices 5072. Specifically, other input devices 5072 may include, but are not limited to, a physical keyboard, a function key (such as a volume control key, an on-off key, and the like), a trackball, a mouse, and a joystick. Details are not described herein.

Further, the touch panel 5071 may be overlaid on the display panel 5061, and when the touch panel 5071 detects a touch operation on or near the touch panel, the touch panel 5071 is transmitted to the processor 510 to determine a type of a touch event, and then the processor 510 provides a corresponding visual output on the display panel 5061 according to the type of the touch event. Although in FIG. 5, the touch panel 5071 and the display panel 5061 are implemented as two separate components to implement the input and output functions of the terminal, in some embodiments, the touch panel 5071 and the display panel 5061 may be integrated to implement the input and output functions of the terminal, which are not specifically limited herein.

The interface unit 508 is an interface where an external device is connected to the mobile terminal 500. For example, an external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 508 may be used to receive input (e.g., data information, power, etc.) from an external device and transmit the received input to one or more elements within the mobile terminal 500 or may be used to transmit data between the mobile terminal 500 and the external device.

Memory 509 may be used to store software programs and various data. The memory 509 may mainly include a storage program area and a storage data area, wherein the storage program area may store an operating system, an application program (such as a sound play function, an image play function, and the like) required by at least one function, and the like; The storage data area may store data (such as audio data, a phone book, and the like) created according to use of the handset, and the like. In addition, memory 509 may include high speed random access memory, and may also include non-volatile memory, such as at least one magnetic disk storage device, flash memory device, or other volatile solid state storage device.

The processor 510 is a control center of the mobile terminal, connects various parts of the entire terminal by various interfaces and lines, executes various functions of the terminal and processes data by running or executing software programs and/or modules stored in the memory 509 and invoking data stored in the memory 509, thereby performing overall monitoring of the terminal. Processor 510 may include one or more processing units; alternatively, the processor 510 may integrate an application processor and a modem processor, wherein the application processor mainly processes an operating system, a user interface, an application program, and the like, and the modem processor mainly processes wireless communication. It will be appreciated that the modem processor described above may also not be integrated into the processor 510.

The mobile terminal 500 may also include a power supply 511 (such as a battery) that supplies power to the various components. Optionally, the power supply 511 may be logically connected to the processor 510 through a power management system to perform functions such as managing charging, discharging, and power consumption management through the power management system.

In addition, the mobile terminal 500 may also include functional modules not shown, and details are not described herein.

A network device is further provided in an embodiment of the present disclosure, a processor, a memory and a computer program stored in the memory and executable on the processor, where the processor executes the computer program to perform the transmission method hereinabove, and the same technical effect can be achieved. To avoid repetition, details are not described herein.

Figure 6:
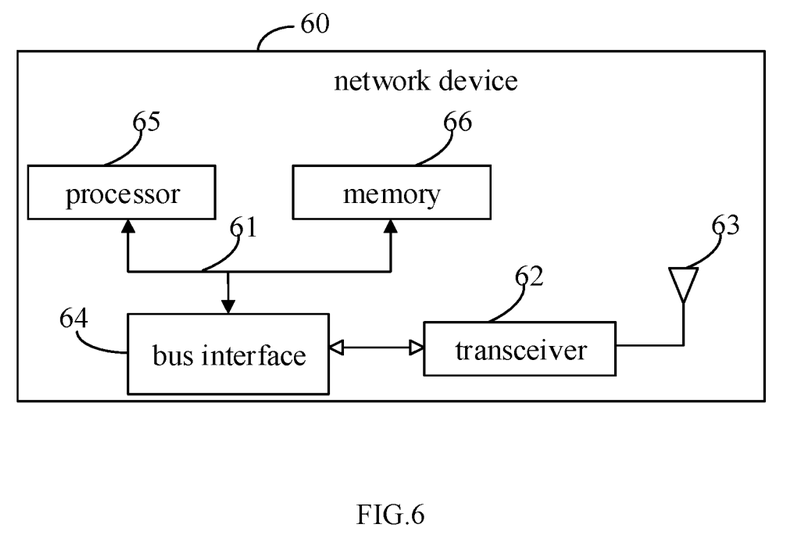
FIG. 6 is a second schematic structural diagram of a network device in an embodiment of the present disclosure.

Specifically, FIG. 6 is a schematic diagram of a hardware structure of a network device 60 including, but not limited to, a bus 61, a transceiver 62, an antenna 63, a bus interface 64, a processor 65, and a memory 66 for implementing various embodiments of the present disclosure.

In an embodiment of the present disclosure, the network device 60 further includes a computer program stored on the memory 66 and operable on the processor 65, the processor 65 executes the computer program to:

send, to a mobile terminal, Downlink Control Information (DCI) configured to indicate a scheduling of an uplink service data and indicate to report an Aperiodicity-Channel State Information (A-CSI) report;

perform a reception processing of the uplink service data and the A-CSI report on a Physical Uplink Shared Channel (PUSCH);

where the DCI carries at least one piece of resource indication information, and the PUSCH is determined according to the at least one piece of resource indication information.

A transceiver 62 is configured to receive and transmit data under the control of the processor 65.

In FIG. 6, a bus architecture (represented by bus 61) may include any number of interconnected buses and bridges that link together various circuits including one or more processors represented by processor 65 and memory represented by memory 66. Bus 61 may also link various other circuits, such as peripherals, voltage regulators, and power management circuits, all of which are well known in the art and therefore will not be described further herein. Bus interface 64 provides an interface between bus 61 and transceiver 62. The transceiver 62 may be an element or may be a plurality of elements, such as a plurality of receivers and transmitters, providing units for communicating with various other devices on the transmission medium. The data processed by the processor 65 is transmitted over the wireless medium through the antenna 63, which further receives the data and transmits the data to the processor 65.

The processor 65 is responsible for managing the bus 61 and general processing, and may also provide various functions, including timing, peripheral interfaces, voltage regulation, power management, and other control functions. The memory 66 may be used to store data used by the processor 65 in performing operations.

Optionally, the processor 65 may be a CPU, an ASIC, an FPGA, or a CPLD.

A computer-readable storage medium is further provided in an embodiments of the present disclosure, where a computer program is stored in the computer readable storage medium, and a processor executes the computer program to perform the transmission method, and achieves the same technical effect. To avoid repetition, details are not described herein. The computer readable storage medium is, for example, a Read-Only Memory (Read-Only Memory, ROM), a Random Access Memory (Random Access Memory, RAM), a magnetic disk, an optical disk, or the like.

It is to be noted that, in this context, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without more limitations, element by defined the statement "include a . . . " does not rule out there are additional identical elements in a process, method, article, or apparatus that includes the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The embodiments of the present disclosure have been described above in connection with the drawings, but the present disclosure is not limited to the specific embodiments described above. The specific embodiments described above are merely illustrative and not restrictive, and those of ordinary skill in the art will be able to make many forms without departing from the principle of the disclosure and the scope of the claims, all of which fall within the scope of the disclosure.

What is claimed is:

1. A transmission method for a mobile terminal, comprising:
receiving Downlink Control Information (DCI) sent by a network side, wherein the DCI is configured to indicate a scheduling of an uplink service data and indicate to report an Aperiodicity-Channel State Information (A-CSI) report;
performing a physical layer transmission processing of a to-be-transmitted uplink service data and the A-CSI report on Physical Uplink Shared Channels (PUSCHs);
wherein the DCI carries at least one piece of resource indication information, and the PUSCHs are determined according to the at least one piece of resource indication information;
wherein the performing a physical layer transmission processing of a to-be-transmitted uplink service data and the A-CSI report on Physical Uplink Shared Channels (PUSCHs) comprises:
transmitting the to-be-transmitted uplink service data and a preset data on the PUSCHs, wherein the preset data is one of:
the A-CSI report generated based on a CSI reference resource or a target reference signal, a historical A-CSI report, or indication information indicating that the A-CSI report is not sent;
or
transmitting the to-be-transmitted uplink service data on the PUSCHs, and cancelling a transmission of the A-CSI report;
wherein the transmitting the to-be-transmitted uplink service data and the preset data on the PUSCHs comprises:
in the case that the A-CSI report is not able to be generated based on the CSI reference resource or the target reference signal, transmitting the to-be-transmitted uplink service data and the historical A-CSI report on the PUSCHs, or transmitting, on the PUSCHs, the to-be-transmitted uplink service data and the indication information indicating that the A-CSI report is not sent.

2. The transmission method according to claim 1, wherein the at least one piece of resource indication information comprises first resource indication information corresponding to the uplink service data and second resource indication information corresponding to the A-CSI report, the first resource indication information corresponds to a first slot offset value, and the second resource indication information corresponds to a second slot offset value;
the performing the physical layer transmission processing of the to-be-transmitted uplink service data and the A-CSI report on the PUSCHs comprises:
performing the physical layer transmission processing of the to-be-transmitted uplink service data and the A-CSI report on a target PUSCH in the PUSCHs;
wherein
the target PUSCH is determined according to a larger one of the first slot offset value and the second slot offset value;
or,
the at least one piece of resource indication information includes only one piece of third resource indication information corresponding to a slot offset value pair, the slot offset value pair comprises: a first slot offset value corresponding to the uplink service data and a second slot offset value corresponding to the A-CSI report;

the performing the physical layer transmission processing of the to-be-transmitted uplink service data and the A-CSI report on the PUSCHs comprise:

performing the physical layer transmission processing of the to-be-transmitted uplink service data and the A-CSI report on a target PUSCH in the PUSCHs;

wherein the target PUSCH is determined according to one of the first slot offset value and the second slot offset value;

or the at least one piece of resource indication information includes only one piece of fifth resource indication information corresponding to a slot offset value pair, the slot offset value pair comprises: a fifth slot offset value used in the case that the DCI does not include an A-CSI report trigger indication, and a sixth slot offset value used in the case that the DCI includes an A-CSI report trigger indication, the sixth slot offset value is greater than or equal to the fifth slot offset value;

the performing the physical layer transmission processing of the to-be-transmitted uplink service data and the A-CSI report on the PUSCH s comprises:

performing the physical layer transmission processing of the to-be-transmitted uplink service data and the A-CSI report on a target PUSCH in the PUSCHs;

wherein the target PUSCH is determined according to the sixth slot offset value.

3. The transmission method according to claim 1, wherein the at least one piece of resource indication information includes only one piece of fourth resource indication information corresponding to a fourth slot offset value;

the performing the physical layer transmission processing of the to-be-transmitted uplink service data and the A-CSI report on the PUSCH comprises:

performing the physical layer transmission processing of the to-be-transmitted uplink service data and the A-CSI report on a target PUSCH in the PUSCHs;

wherein the target PUSCH is determined according to the fourth slot offset value.

4. The transmission method according to claim 1, wherein the at least one piece of resource indication information includes first resource indication information corresponding to the uplink service data and second resource indication information corresponding to the A-CSI report, the first resource indication information corresponds to a first slot offset value, and the second resource indication information corresponds to a second slot offset value;

the performing the physical layer transmission processing of the to-be-transmitted uplink service data and the A-CSI report on the PUSCH comprises:

transmitting the to-be-transmitted uplink service data on a first target PUSCH in the PUSCHs corresponding to the first slot offset value and transmitting the A-CSI report through a second target PUSCH in the PUSCHs corresponding to the second slot offset value, in the case that the first slot offset value and the second slot offset value are different; or transmitting the to-be-transmitted uplink service data and the A-CSI report on the target PUSCH in the PUSCHs corresponding to the first slot offset value, in the case that the first slot offset value and the second slot offset value are the same.

5. The transmission method according to claim 1, wherein the transmitting the to-be-transmitted uplink service data and the preset data on the PUSCHs comprise:

in the case that the A-CSI report is able to be generated based on the CSI reference resource or the target reference signal, transmitting the to-be-transmitted uplink service data and the generated A-CSI report on the PUSCHs.

6. The transmission method according to claim 1, wherein the transmitting the to-be-transmitted uplink service data on the PUSCHs and cancelling the transmission of the A-CSI report comprises:

in the case that the A-CSI report is not able to be generated based on the CSI reference resource or the target reference signal, transmitting the to-be-transmitted uplink service data on the PUSCHs and cancelling the transmission of the A-CSI report.

7. A mobile terminal, comprising: a processor, a memory and a computer program stored in the memory and executable on the processor, wherein the processor executes the computer program to:

receive Downlink Control Information (DCI) sent by a network side, wherein the DCI is configured to indicate a scheduling of an uplink service data and indicate to report an Aperiodicity-Channel State Information (A-CSI) report;

perform a physical layer transmission processing of a to-be-transmitted uplink service data and the A-CSI report on Physical Uplink Shared Channels (PUSCHs);

wherein the DCI carries at least one piece of resource indication information, and the PUSCHs are determined according to the at least one piece of resource indication information;

wherein the processor executes the computer program to:

transmit the to-be-transmitted uplink service data and a preset data on the PUSCHs, wherein the preset data is one of:

the A-CSI report generated based on a CSI reference resource or a target reference signal, a historical A-CSI report, or indication information indicating that the A-CSI report is not sent;

or transmit the to-be-transmitted uplink service data on the PUSCHs, and cancel a transmission of the A-CSI report;

wherein the processor executes the computer program to:

in the case that the A-CSI report is not able to be generated based on the CSI reference resource or the target reference signal, transmit the to-be-transmitted uplink service data and the historical A-CSI report on the PUSCHs, or transmit, on the PUSCHs, the to-be-transmitted uplink service data and the indication information indicating that the A-CSI report is not sent.

8. The mobile terminal according to claim 7, wherein the at least one piece of resource indication information includes only one piece of fourth resource indication information corresponding to a fourth slot offset value;

the processor executes the computer program to:

perform the physical layer transmission processing of the to-be-transmitted uplink service data and the A-CSI report on a target PUSCH;

wherein the target PUSCH is determined according to the fourth slot offset value.

9. The mobile terminal according to claim 7, wherein the processor executes the computer program to:

in the case that the A-CSI report is able to be generated based on the CSI reference resource or the target reference signal, transmit the to-be-transmitted uplink service data and the generated A-CSI report on the PUSCHs.

10. The mobile terminal according to claim 7, wherein the processor executes the computer program to:
in the case that the A-CSI report is not able to be generated based on the CSI reference resource or the target reference signal, transmit the to-be-transmitted uplink service data on the PUSCHs and cancel the transmission of the A-CSI report.

11. The mobile terminal according to claim 7, wherein the at least one piece of resource indication information comprises first resource indication information corresponding to the uplink service data and second resource indication information corresponding to the A-CSI report, the first resource indication information corresponds to a first slot offset value, and the second resource indication information corresponds to a second slot offset value;
wherein the processor executes the computer program to:
perform the physical layer transmission processing of the to-be-transmitted uplink service data and the A-CSI report on a target PUSCH in the PUSCHs;
wherein
the target PUSCH is determined according to a larger one of the first slot offset value and the second slot offset value;
or,
the at least one piece of resource indication information includes only one piece of third resource indication information corresponding to a slot offset value pair, the slot offset value pair comprises: a first slot offset value corresponding to the uplink service data and a second slot offset value corresponding to the A-CSI report;
wherein the processor executes the computer program to:
perform the physical layer transmission processing of the to-be-transmitted uplink service data and the A-CSI report on a target PUSCH in the PUSCHs;
wherein the target PUSCH is determined according to one of the first slot offset value and the second slot offset value;
or
the at least one piece of resource indication information includes only one piece of fifth resource indication information corresponding to a slot offset value pair, the slot offset value pair comprises: a fifth slot offset value used in the case that the DCI does not include an A-CSI report trigger indication, and a sixth slot offset value used in the case that the DCI includes an A-CSI report trigger indication, the sixth slot offset value is greater than or equal to the fifth slot offset value;
wherein the processor executes the computer program to:
perform the physical layer transmission processing of the to-be-transmitted uplink service data and the A-CSI report on a target PUSCH in the PUSCHs;
wherein the target PUSCH is determined according to the sixth slot offset value.

12. The mobile terminal according to claim 7, wherein the at least one piece of resource indication information includes first resource indication information corresponding to the uplink service data and second resource indication information corresponding to the A-CSI report, the first resource indication information corresponds to a first slot offset value, and the second resource indication information corresponds to a second slot offset value;
wherein the processor executes the computer program to:
transmit the to-be-transmitted uplink service data on a first target PUSCH in the PUSCHs corresponding to the first slot offset value and transmitting the A-CSI report through a second target PUSCH in the PUSCHs corresponding to the second slot offset value, in the case that the first slot offset value and the second slot offset value are different; or
transmit the to-be-transmitted uplink service data and the A-CSI report on the target PUSCH in the PUSCHs corresponding to the first slot offset value, in the case that the first slot offset value and the second slot offset value are the same.

13. A non-transitory computer readable storage medium, wherein a computer program is stored in the computer readable storage medium, and a processor executes the computer program to perform:
receiving Downlink Control Information (DCI) sent by a network side, wherein the DCI is configured to indicate a scheduling of an uplink service data and indicate to report an Aperiodicity-Channel State Information (A-CSI) report;
performing a physical layer transmission processing of a to-be-transmitted uplink service data and the A-CSI report on Physical Uplink Shared Channels (PUSCHs);
wherein the DCI carries at least one piece of resource indication information, and the PUSCHs are determined according to the at least one piece of resource indication information;
wherein the performing a physical layer transmission processing of a to-be-transmitted uplink service data and the A-CSI report on Physical Uplink Shared Channels (PUSCHs) comprises:
transmitting the to-be-transmitted uplink service data and a preset data on the PUSCHs, wherein the preset data is one of:
the A-CSI report generated based on a CSI reference resource or a target reference signal, a historical A-CSI report, or indication information indicating that the A-CSI report is not sent;
or
transmitting the to-be-transmitted uplink service data on the PUSCHs, and cancelling a transmission of the A-CSI report;
wherein the transmitting the to-be-transmitted uplink service data and the preset data on the PUSCHs comprises:
in the case that the A-CSI report is not able to be generated based on the CSI reference resource or the target reference signal, transmitting the to-be-transmitted uplink service data and the historical A-CSI report on the PUSCHs, or transmitting, on the PUSCHs, the to-be-transmitted uplink service data and the indication information indicating that the A-CSI report is not sent.

14. The non-transitory computer readable storage medium according to claim 13, wherein the at least one piece of resource indication information comprises first resource indication information corresponding to the uplink service data and second resource indication information corresponding to the A-CSI report, the first resource indication information corresponds to a first slot offset value, and the second resource indication information corresponds to a second slot offset value;

the performing the physical layer transmission processing of the to-be-transmitted uplink service data and the A-CSI report on the PUSCHs comprises:
performing the physical layer transmission processing of the to-be-transmitted uplink service data and the A-CSI report on a target PUSCH in the PUSCHs;
wherein
the target PUSCH is determined according to a larger one of the first slot offset value and the second slot offset value;
or,
the at least one piece of resource indication information includes only one piece of third resource indication information corresponding to a slot offset value pair, the slot offset value pair comprises: a first slot offset value corresponding to the uplink service data and a second slot offset value corresponding to the A-CSI report;
the performing the physical layer transmission processing of the to-be-transmitted uplink service data and the A-CSI report on the PUSCHs comprises:
performing the physical layer transmission processing of the to-be-transmitted uplink service data and the A-CSI report on a target PUSCH in the PUSCHs;
wherein the target PUSCH is determined according to one of the first slot offset value and the second slot offset value;
or
the at least one piece of resource indication information includes only one piece of fifth resource indication information corresponding to a slot offset value pair, the slot offset value pair comprises: a fifth slot offset value used in the case that the DCI does not include an A-CSI report trigger indication, and a sixth slot offset value used in the case that the DCI includes an A-CSI report trigger indication, the sixth slot offset value is greater than or equal to the fifth slot offset value;
the performing the physical layer transmission processing of the to-be-transmitted uplink service data and the A-CSI report on the PUSCHs comprises:
performing the physical layer transmission processing of the to-be-transmitted uplink service data and the A-CSI report on a target PUSCH in the PUSCHs;
wherein the target PUSCH is determined according to the sixth slot offset value.

15. The non-transitory computer readable storage medium according to claim 13, wherein the at least one piece of resource indication information includes only one piece of fourth resource indication information corresponding to a fourth slot offset value;

the performing the physical layer transmission processing of the to-be-transmitted uplink service data and the A-CSI report on the PUSCH comprises:
performing the physical layer transmission processing of the to-be-transmitted uplink service data and the A-CSI report on a target PUSCH in the PUSCHs;
wherein the target PUSCH is determined according to the fourth slot offset value.

16. The non-transitory computer readable storage medium according to claim 13, wherein the at least one piece of resource indication information includes first resource indication information corresponding to the uplink service data and second resource indication information corresponding to the A-CSI report, the first resource indication information corresponds to a first slot offset value, and the second resource indication information corresponds to a second slot offset value;
the performing the physical layer transmission processing of the to-be-transmitted uplink service data and the A-CSI report on the PUSCH comprises:
transmitting the to-be-transmitted uplink service data on a first target PUSCH in the PUSCHs corresponding to the first slot offset value and transmitting the A-CSI report through a second target PUSCH in the PUSCHs corresponding to the second slot offset value, in the case that the first slot offset value and the second slot offset value are different; or
transmitting the to-be-transmitted uplink service data and the A-CSI report on the target PUSCH in the PUSCHs corresponding to the first slot offset value, in the case that the first slot offset value and the second slot offset value are the same.

17. The non-transitory computer readable storage medium according to claim 13, wherein the transmitting the to-be-transmitted uplink service data and the preset data on the PUSCHs comprises:
in the case that the A-CSI report is able to be generated based on the CSI reference resource or the target reference signal, transmitting the to-be-transmitted uplink service data and the generated A-CSI report on the PUSCHs.

18. The non-transitory computer readable storage medium according to claim 13, wherein the transmitting the to-be-transmitted uplink service data on the PUSCHs and cancelling the transmission of the A-CSI report comprises:
in the case that the A-CSI report is not able to be generated based on the CSI reference resource or the target reference signal, transmitting the to-be-transmitted uplink service data on the PUSCHs and cancelling the transmission of the A-CSI report.

* * * * *